Dec. 12, 1961     C. T. REYNER     3,012,478
REFLECTORS
Filed Nov. 29, 1957
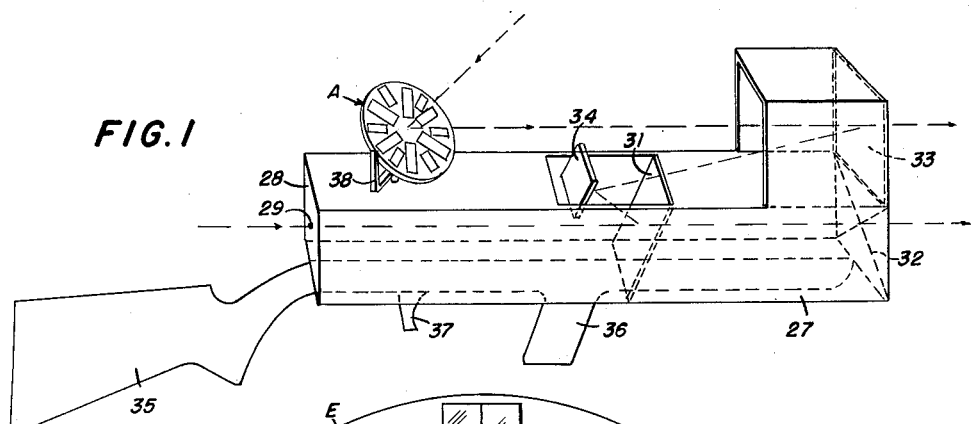
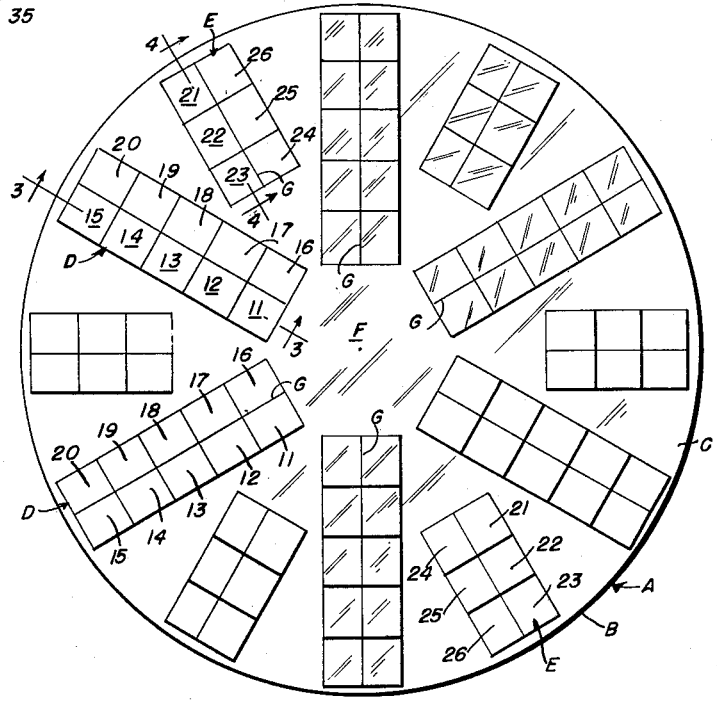
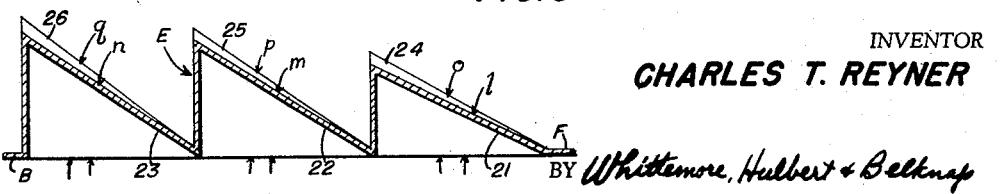
INVENTOR
CHARLES T. REYNER
BY *Whittemore, Hulbert & Belknap*
ATTORNEYS

United States Patent Office 3,012,478
Patented Dec. 12, 1961

3,012,478
REFLECTORS
Charles T. Reyner, Washington, D.C.
(632 Beacon Road, Silver Spring, Md.)
Filed Nov. 29, 1957, Ser. No. 699,706
7 Claims. (Cl. 88—78)

The present invention relates to heliographic signaling apparatus and more particularly to the construction of a novel form of reflecting mirror for use in a device of this type.

It has been customary to employ in conventional forms of portable heliographs mirrors which have essentially flat reflecting surfaces, together with means for interrupting beams of light to project toward a selected location messages in Morse, International, or other codes. The projection of a beam of sunlight reflected from a flat surface to a definite point by means of an instrument such as a hand held heliograph is at best a haphazard operation in spite of efforts to improve the accuracy of this kind of apparatus. As an example, a flat reflector which is moved one degree with respect to the rays emanating from the sun will shift the reflected beam a distance of approximately fifty-two feet off a target 1,000 yards distant from the reflecting mirror and about ninety-two feet off the target at a distance of one mile. It is obvious that a portable heliograph, with a flat reflecting mirror, even in the hands of an experienced operator with relatively steady nerves, is unsuitable for accurate transmission of messages, especially if they be in code, it being necessary that interruptions to reflected beams be intentional rather than accidental. It is also necessary to take into account the movement of the sun, the reflection of which, with respect to a fixed mirror and a fixed target, will result in a shift of the reflected beam of approximately twenty-three feet per minute at a distance of one mile between mirror and target.

It is one of the objects of this invention to obviate the difficulties incident to the employment of flat mirrors in portable heliographs by providing a reflector which disperses reflected beams of sunlight without, however, sacrificing intensity, the diameter of reflection being such that the target will be in line with one or more of a multiplicity of reflected beams regardless of angular deviations of the reflector with respect to the sun.

It is another object of the invention so to construct a reflecting mirror that a series of reflecting surfaces are disposed in pre-selected angular relation to each other both radially and arcuately in a unitary structure so that a dispersion of reflected beams of light directed toward a target is obtained.

Other objects will be apparent from the following description of a preferred embodiment of the invention when taken with the accompanying drawings, in which:

FIG. 1 is a perspective view of a portable heliographic signaling device in which is incorporated a mirror made in accordance with the concept of the reflector forming the basis of this invention;

FIG. 2 is a plan view of a composite mirror comprising one form of the invention;

FIG. 3 is a sectional view of one part of the reflecting mirror taken on line 3—3 of FIG. 2; and FIG. 4 is a sectional view of another portion of the mirror taken on line 4—4 of FIG. 2.

In the drawings, the reflector A comprises a base B which is flat and is preferably, although not necessarily, generally circular. The face of this base is provided with a reflecting surface C. Portions D and E are pressed or otherwise displaced from the base to form a multiplicity of supplementary flat reflecting surfaces disposed in pre-selected angular relation with respect to each other and to the flat surface of the base. It will be seen that each of the displaced portions D and E extend radially from the center F of the base and their longitudinal center lines G are spaced angularly from each other an equal number of degrees. In the form illustrated in FIG. 2 the center lines of the longer portions D are angularly spaced 60° with respect to each other, the portions E also being spaced apart 60° and midway between portions D.

Each of the portions D is divided into ten sections designated by the reference characters 11 to 20. Each portion E is divided into six sections designated by the reference characters 21 to 26. Each of these sections or elements is a flat reflecting mirror. FIGS. 3 and 4 illustrate the manner in which the sections are offset angularly with respect to each other and to the base B, the angle shown being greatly exaggerated to permit better illustrations of the principles involved. Actually these angles are relatively small, ranging in increments of 15′ from the least angularly displaced surface to 4° for the surface of the most angularly offset section in the preferred embodiment illustrated herein. These angles may vary somewhat within certain limits, but it has been determined that excellent results are obtained with a reflector made in accordance with this disclosure. It will be seen that the lowermost end of each sectional element lies in the plane of the base B so that the uppermost ends of the elements are in stepped relation with respect to adjacent sections, the lower edges of the elements being parallel to each other.

Referring to FIG. 3, the angularity of the surface of section 11 is designated by the letter $a$, this surface being disposed at an angle of 15′ with respect to base B. The surface of section 16 adjacent to section 11 is at an angle of 30′ with the base, this angle being represented by the letter $f$.

The angles of the surfaces of the several sections of portions D are as follows:

$a$—0°15′      $f$—0°30′
$b$—0°45′      $g$—1°0′
$c$—1°15′      $h$—1°30′
$d$—1°45′      $j$—2°0′
$e$—2°15′      $k$—2°30′

The surfaces of the sections forming portions E of the reflector are as follows:

$l$—2°45′      $o$—3°0′
$m$—3°15′      $p$—3°30′
$n$—3°45′      $q$—4°0′

One form of heliograph in which a composite mirror of the type described has been incorporated is shown in FIG. 1. A box-like body 27 has a closure plate 28 at one end, the plate having a peep-hole 29 at its center. A transparent glass 31 permits sighting of the distant target through cross-hairs 32. At the same time light from the sun is directed by mirror A to shutter 33 from which it is reflected by mirror 34 and glass plate 31 to peep-hole 29. Suitable shoulder and hand rests 35, 36 are secured to the heliograph and a trigger 37 is connected by conventional means to shutter 33 to permit opening of the shutter. A by properly operating the trigger-controlled shutter it is obvious that code messages may be sent to an observer stationed at the target. As is customary, the reflector is universally mounted on swivel 38 so that it may be adjusted to provide coincident sighting of the sun and target in the heliograph.

With the arrangement described, it is obvious that there is obtained a relatively wide dispersal of reflected rays directed toward a target. Assuming that there is a circular area in the target plane forming a pattern of reflected beams from certain of the flat selectional mirrors, it has been determined that at 1000 yards the diameter of this area will be approximately 840 feet and at one mile the area will have a diameter of about 1480 feet. Therefore, regardless of slight deviations in the reflector, it will be appreciated that much of the light falling on the composite mirror will be reflected to the target.

A preferred form of composite mirror has been described, but certain modifications are permissible without materially varying the effectiveness of the apparatus. Although it has been stated that the reflecting surfaces C and those of the several sectional mirrors or reflecting elements are on one side of the base, the reflector will perform equally well if the opposite side of the base and the angularly disposed elements are utilized as reflecting mirrors. It is also apparent that the progressive increase in the angles of the sections may start adjacent the peripheray of the reflector as distinguished from the form shown in the drawing wherein the smaller angles are nearest the center of the reflector. In the illustrated form of the invention the reflected beams across each other between the reflector and the target, but were the smaller angles furthest from the center of the reflector then the reflected beams would be directed to the target without crossing each other.

The composite mirror has been described as being pressed from a single sheet. However, the sectional mirrors may be made separately and attached to a base. Also the base and the angled sections may be molded from suitable materials, such as plastics, and the surfaces silvered or otherwise coated to form reflecting surfaces. Such other modifications of the invention as fall within definitions thereof as expressed in the claims are contemplated.

What is claimed is:

1. A reflector comprising a flat base, and a plurality of reflecting portions on and offset with respect to the plane of said base, said portions radiating from a common center, each of said portions being divided into a multiplicity of flat elements, said elements being in angular relation to said base and to an axial line normal to said base at said common center, the angularity of said elements progressively varying with respect to said center, the lower edges of said elements being normal to lines radiating from said center, said lower edges lying in the plane of said base, said reflecting portions being so spaced from said common center that rays reflected from each of said portions intersect said axial line at a distance spaced from the intersection of rays reflected by any one of the others of said portions with said axial line.

2. A reflector as defined in claim 1 in which the angularity of said flat elements progressively increases with respect to said center.

3. A reflector as defined in claim 1 in which each of said portions is divided into at least two adjacent series of flat elements, each of said series extending radially from said center, the angularity of the elements of one series differing from that of the elements of the other series.

4. A reflector as defined in claim 3 in which the angularity of said flat elements progressively varies with respect to said center.

5. A reflector as defined in claim 4 in which the angularity of said flat elements progressively increases with respect to said center.

6. A reflector as defined in claim 1 in which the angularity of one of said elements differs from that of the next adjacent element.

7. A reflector as defined in claim 6 in which the angularity of each element differs from that of any of the other of said elements.

References Cited in the file of this patent

UNITED STATES PATENTS

| | | |
|---|---|---|
| 340,490 | Cummings | Apr. 20, 1886 |
| 1,386,781 | Harvey | Aug. 9, 1921 |
| 2,547,342 | Nirdlinger | Apr. 3, 1951 |
| 2,573,812 | Schroeder | Nov. 6, 1951 |
| 2,707,903 | Trombe | May 10, 1955 |
| 2,763,187 | Wiener | Sept. 18, 1956 |